US011016655B2

(12) United States Patent
Chakra et al.

(10) Patent No.: US 11,016,655 B2
(45) Date of Patent: *May 25, 2021

(54) RECONFIGURING A USER INTERFACE ACCORDING TO INTERFACE DEVICE DETERIORATION

(71) Applicant: International Business Machines Corporation, Armonk, NY (US)

(72) Inventors: Al Chakra, Apex, NC (US); Gary Denner, County Meath (IE); Jonathan Dunne, County Waterford (IE); Liam Harpur, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/385,190

(22) Filed: Apr. 16, 2019

(65) Prior Publication Data
US 2019/0243522 A1    Aug. 8, 2019

Related U.S. Application Data

(63) Continuation of application No. 14/837,189, filed on Aug. 27, 2015, now Pat. No. 10,346,029, and a (Continued)

(51) Int. Cl.
*G06F 3/0488* (2013.01)
*G06F 3/041* (2006.01)
(Continued)

(52) U.S. Cl.
CPC ........... *G06F 3/0488* (2013.01); *G06F 3/0416* (2013.01); *G06F 3/0482* (2013.01); *G06F 3/0484* (2013.01)

(58) Field of Classification Search
CPC .... G06F 3/0416; G06F 3/0418; G06F 3/0482; G06F 3/0484; G06F 3/0488
See application file for complete search history.

(56) References Cited

U.S. PATENT DOCUMENTS

| 2008/0231604 A1* | 9/2008 | Peterson | ............ G06F 3/04886 345/173 |
| 2012/0089914 A1* | 4/2012 | Holt | ................... G06F 3/04855 715/728 |

(Continued)

OTHER PUBLICATIONS

List of All IBM Related Applications, Appendix P, 2019.

*Primary Examiner* — Tan H Tran
(74) *Attorney, Agent, or Firm* — Garg Law Firm, PLLC; Rakesh Garg; Teddi Maranzano

(57) ABSTRACT

For reconfiguring a user interface (UI) layout according to a deterioration of an interface device, a UI layout is analyzed to determine a position of a UI element on the interface device according to the UI layout determination is made that the UI element is positioned in a first area of the interface device, the first area having a first sensitivity to touch, where the first sensitivity is below a level of sensitivity. A second area of the interface device is identified, the second area having a second sensitivity to touch, where the second sensitivity is at least equal to the level of sensitivity. The UI element is relocated from the first area to the second area thereby forming a modified UI layout. The modified UI layout is sent for rendering on the interface device.

16 Claims, 8 Drawing Sheets

Related U.S. Application Data continuation of application No. 14/753,683, filed on Jun. 29, 2015, now Pat. No. 10,359,928.

(51) Int. Cl.
*G06F 3/0482* (2013.01)
*G06F 3/0484* (2013.01)

(56) References Cited

U.S. PATENT DOCUMENTS

| | | | | |
|---|---|---|---|---|
| 2014/0152583 A1* | 6/2014 | Bastide | ............... | G06F 3/0488 345/173 |
| 2014/0253494 A1* | 9/2014 | Jiang | ............... | G06F 3/0488 345/174 |
| 2014/0320437 A1* | 10/2014 | Kang | ............... | G06F 3/0416 345/173 |
| 2015/0193074 A1* | 7/2015 | Cudak | ............... | G06F 3/0412 345/173 |

* cited by examiner

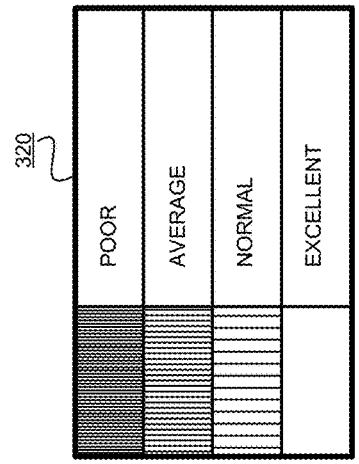
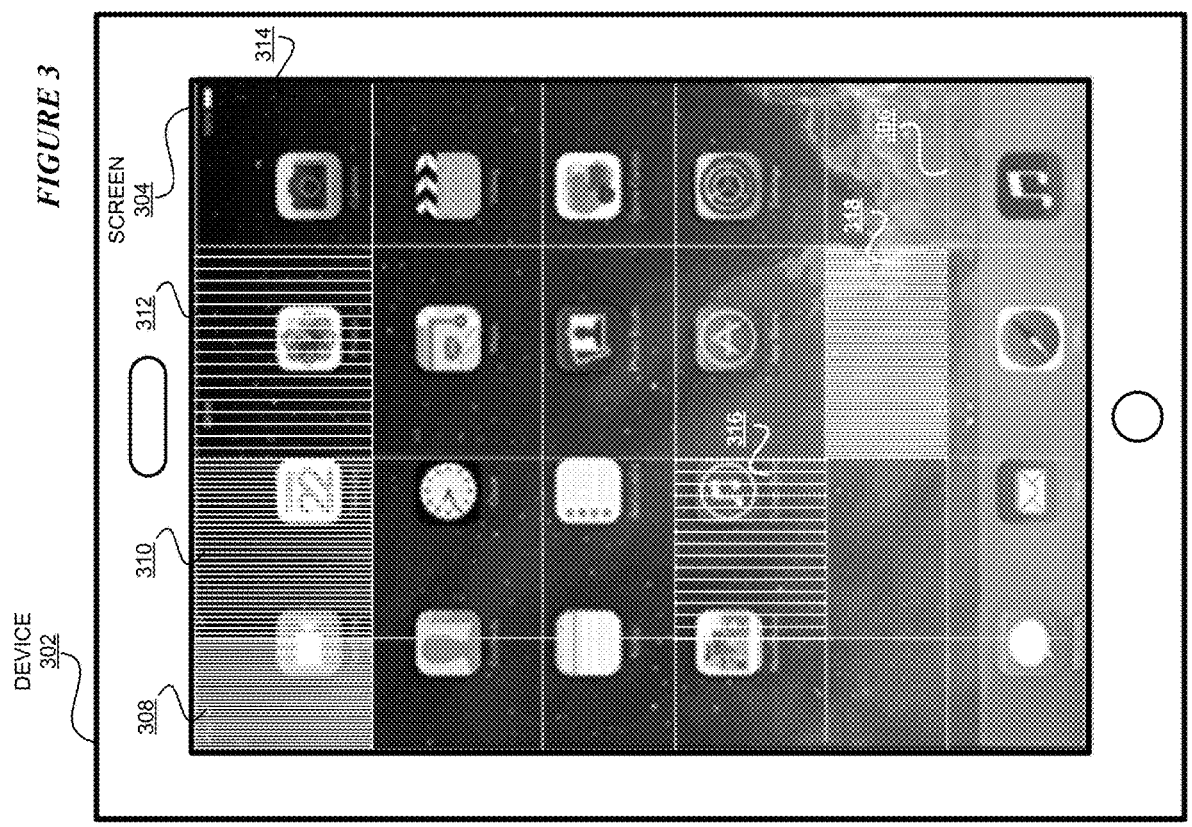
FIGURE 3

RECONFIGURING A USER INTERFACE ACCORDING TO INTERFACE DEVICE DETERIORATION

TECHNICAL FIELD

The present invention relates generally to a method, system, and computer program product for continuing to use a deteriorating device. More particularly, the present invention relates to a method, system, and computer program product for reconfiguring a user interface according to a deterioration of an interface device.

BACKGROUND

A variety of user interface devices is available for presenting content to a user in a variety of ways. Some examples of such interface devices include, but are not limited to, screens enabled to accept touch-based inputs (touchscreen) and screens or boards capable of presenting content in Braille for visually impaired users, and the like.

Touching a surface invariably causes wear and tear of the surface. When that surface is a touchscreen, the wear and tear includes diminishing sensitivity of the touch-sensing elements build into the touchscreen over a period of use. Similarly, when the surface is a part of a Braille board, the wear and tear includes reduced height or feel of the Braille dots.

SUMMARY

The illustrative embodiments provide a method, system, and computer program product for reconfiguring a user interface according to a deterioration of an interface device. An embodiment includes a method for reconfiguring a user interface (UI) layout according to a deterioration of an interface device. The embodiment analyzes, using a processor and a memory of a data processing system, a UI layout to determine a position of a UI element on the interface device according to the UI layout. The embodiment determines that the UI element is positioned in a first area of the interface device, the first area having a first sensitivity to touch, where the first sensitivity is below a level of sensitivity. The embodiment identifies a second area of the interface device, the second area having a second sensitivity to touch, where the second sensitivity is at least equal to the level of sensitivity. The embodiment relocates the UI element from the first area to the second area thereby forming a modified UI layout. The embodiment sends the modified UI layout for rendering on the interface device.

Another embodiment includes a computer usable program product comprising a computer readable storage device including computer usable code for reconfiguring a user interface (UI) layout according to a deterioration of an interface device.

Another embodiment includes a data processing system for reconfiguring a user interface (UI) layout according to a deterioration of an interface device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for measuring and presenting screen sensitivity in accordance with an illustrative embodiment;

DETAILED DESCRIPTION

Figure 1:
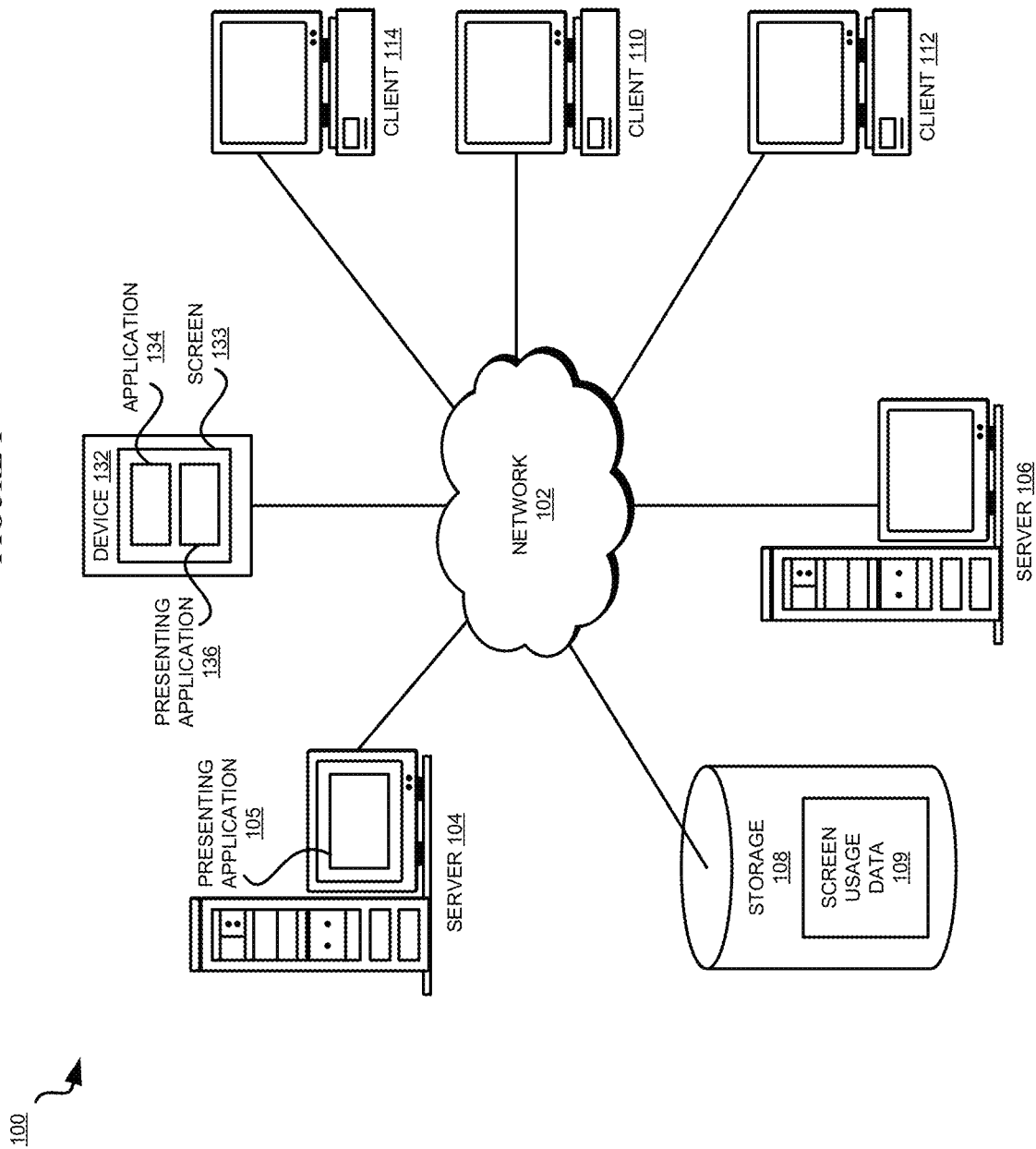
FIG. 1 depicts a block diagram of a network of data processing systems in which illustrative embodiments may be implemented.

The illustrative embodiments are described using a touchscreen as a non-limiting example of an interface device only for the clarity of the description and not to imply any limitations on the illustrative embodiments. From this disclosure, those of ordinary skill in the art will be able to adapt an embodiment to many other types of interface devices, including but not limited to Braille boards, and the same are contemplated within the scope of the illustrative embodiments.

Furthermore, hereinafter, any reference to a "screen" is a reference to a touchscreen unless expressly distinguished where used. A diminished sensitivity of a screen or a portion thereof to touch gestures is also referred to as screen rot.

Users are all too familiar with reduced sensitivity of touchscreens today. It is frustrating when certain parts of a touchscreen do not respond to a touch input as readily as other parts. Often, the touch gesture becomes a forceful pressing action on those less sensitive portions of the touchscreen. At the very least, the forceful pressing is a cause of frustration to the user, but often the result of the reduced sensitivity is much worse when those portions of the touchscreen fail to respond even to the forceful pressing gestures.

The illustrative embodiments recognize that often, portions of a screen become progressively less responsive with use. In some cases, a portion of a screen can be accidentally damaged, such as due to dropping the device or a liquid spill on the device, when portions of a screen become suddenly less responsive due to the damage.

In either case, the user is left with a partially functioning screen on which content is presented. The illustrative embodiments recognize that when a portion of a screen has reduced or no sensitivity, and is marginally responsive or non-responsive to touch gestures, the user cannot sufficiently interact with the content presented in that portion of the screen. The illustrative embodiments recognize that insufficient ability to interact with the content at such a portion of the screen can cause errors in a transaction, incomplete process with a server, timeout during a session, and many other problems.

The illustrative embodiments used to describe the invention generally address and solve the above-described problems and other problems related to interface devices with reduced sensitivity. The illustrative embodiments provide a method, system, and computer program product for reconfiguring a user interface according to a deterioration of an interface device.

An embodiment creates a map of a screen. For example, one embodiment overlays a virtual grid formed by virtual horizontal and vertical lines on the viewable or touch-sensitive screen area. Each cell in the grid covers a portion of the screen within which an embodiment measures the screen's sensitivity to touch gestures. For example, in a touchscreen that uses a resistive method of detecting a touch input, the embodiment measures the resistance change in the portion of the touchscreen corresponding to a grid cell. As another example, in a touchscreen that uses a capacitive method of detecting a touch input, the embodiment measures the change in capacitance resulting from a touch gesture in the portion of the touchscreen corresponding to a grid cell.

The embodiment compares the measured sensitivity, such as a measured change in resistance or capacitance, with a baseline or threshold sensitivity, such as with a threshold amount of change in resistance or capacitance that should occur in response to a touch gesture if the portion of the touch screen has the designed level of touch sensitivity.

The diminished sensitivity to touch gesture, or screen rot, can have several degrees. As a non-limiting example, suppose that the screen sensitivity can be classified into levels such as "excellent", "normal", "average", and "poor". Accordingly, in this example, the portion that has "excellent" sensitivity has no screen rot; the portion that has "normal" sensitivity has some screen rot that is undetectable or not perceivable by the user; the portion that has "average" sensitivity has some screen rot that is detectable or perceivable by the user but the portion is usable with some extra effort and frustration on the part of the user; and the portion that has "poor" sensitivity has screen rot that is detectable or perceivable by the user and the portion is unusable altogether or usable only with extraordinary effort and frustration on the part of the user.

The various embodiments are described using these example levels of sensitivity levels and the corresponding screen rot levels only for the clarity of the description. These examples of sensitivity levels and the corresponding screen rot levels are not intended to be limiting. From this disclosure, those of ordinary skill in the art will be able to conceive many other ways of gauging the sensitivity levels and the corresponding screen rot levels and the same are contemplated within the scope of the illustrative embodiments.

One embodiment regards the excellent level of sensitivity as a threshold amount of sensitivity, such as defined by a threshold amount of change in resistance or capacitance that should occur in response to a touch gesture if the portion of the touch screen has the level of touch sensitivity that the manufacturer has designed into the touchscreen. Accordingly, the normal level of sensitivity of a portion may indicate, for example, up to twenty percent less than the threshold amount of sensitivity in that portion, and corresponding to, for example, up to twenty percent screen rot in that portion. Similarly, the average level of sensitivity may be, for example, between eleven and thirty percent less than the threshold amount of sensitivity, and corresponding to, for example, between eleven and thirty percent screen rot. Similarly, the average level of sensitivity may be, for example, between twenty one and fifty percent less than the threshold amount of sensitivity, and corresponding to, for example, between twenty one and fifty percent screen rot. Similarly, the poor level of sensitivity may be, for example, fifty percent or more below the threshold amount of sensitivity, and corresponding to, for example, fifty one percent or more screen rot.

Once an embodiment measures the sensitivity (screen rot), the measured sensitivity information can be shared with the user via visual cues on the screen. For example, one embodiment visualizes the grid on the screen, i.e., presents the grid visibly to the user. Furthermore, the embodiment visibly presents the measured sensitivity information in the now-visible grids to the user.

For example, one embodiment shades a grid cell according to the measured sensitivity in that cell. The darker the shade of a cell, the poorer the sensitivity and correspondingly higher the screen rot in that cell, and vice versa. Another embodiment colors a grid cell differently according to the measured sensitivity in that cell. Different colors of a cell correspond to different levels of sensitivity and corresponding levels of screen rot in that cell. Any number of shades or colors can be used to indicate any number of levels of sensitivity and screen rot in this manner.

These examples of ways to represent sensitivity information are not intended to be limiting. From this disclosure, those of ordinary skill in the art will be able to conceive many other ways for a similar purpose and the same are contemplated within the scope of the illustrative embodiments. For example, different audible tones, different animations or animation speeds, different combinations of these various methods can similarly be used to represent sensitivity information about the various portions of an interface device, and the same are contemplated within the scope of the illustrative embodiments.

An embodiment is configured to avoid presenting content in those portions of a screen where the measured sensitivity is lower than a pre-determined threshold. This pre-determined threshold is different from the one or more thresholds used to measure the sensitivity levels. For example, the embodiment can be configured to not present any content, or not present that content which requires touch interaction, in a grid cell where the sensitivity is below sixty two percent, or below a normal level, or below a threshold specified in another manner.

One embodiment may present content in such portions if such presentation does not elicit a touch input from the user in such portions. Another embodiment may not present any type of content in such portions regardless of whether the content elicits a touch input from the user in such portions.

Either way, the illustrative embodiments have to modify a user interface (UI) layout of the content such that at least those UI elements in the UI layout, which require touch interaction, and which are positioned in a grid cell where the sensitivity is below the pre-determined threshold, are repositioned away from the cell with unacceptable sensitivity to a cell with acceptable sensitivity. Unacceptable sensitivity is sensitivity below the pre-determined threshold. Acceptable sensitivity is sensitivity at or above the pre-determined threshold.

One embodiment analyzes a UI layout presented by a presenting application. A presenting application is any application that sends content arranged in a UI layout for presentation on the screen according to the UI layout. A UI element is a component of the UI layout. For example, a UI layout can be an arrangement of style-sheets on a webpage, and a UI element can be a button or a checkbox on a style-sheet.

These examples of UI layout and UI elements are not intended to be limiting. From this disclosure, those of ordinary skill in the art will be able to conceive many other UI layouts and UI elements suitable for a particular type of interface device and the same are contemplated within the scope of the illustrative embodiments.

Upon analysis, the embodiment identifies that part of the UI layout which will lie in a grid cell with unacceptable sensitivity. The embodiment modifies the UI layout, to produce a modified UI layout, in which the embodiment repositions that part of the UI layout to another cell with acceptable sensitivity. In one embodiment, the part of the UI layout, which will lie in a grid cell with unacceptable sensitivity, includes a UI element with which a user may interact using a touch gesture.

In such an embodiment the presenting application is not involved in the modification of the UI layout. In other words, the presenting application only sends, and continues to send, the UI layout without regard to screen sensitivities of a particular screen on which the UI layout is going to be presented. The embodiment modifies the UI layout as close as possible to the rendering buffer in the data processing system with which the concerned screen is coupled.

Such a manner of modifying the UI layout is particularly useful when the presenting application resides on a different data processing system, such as a server, and communicates over a data network with the data processing system, such as a client, where the embodiment is executing. It is possible that the presenting application is presenting the UI layout to several screens on several clients, and the UI layout should not be disturbed or modified for a particular issue with the sensitivity of a particular screen at a particular client.

In another embodiment, after the embodiment modifies the UI layout, the embodiment sends the information about the acceptable and unacceptable areas of the screen to the presenting application. Such sent the information is also interchangeably referred to herein as a feedback instruction. The presenting application updates the UI layout such that the future versions of the UI layout avoid presenting content or UI elements in the unacceptable areas of the screen.

In one embodiment, the modified UI layout is also sent to the presenting application along with the information about the acceptable and unacceptable areas of the screen to the presenting application. The presenting application can update the UI layout using the modified UI layout as a guideline.

In another embodiment, the embodiment does not generate a modified UI layout, but upon analysis of a UI layout received from a presenting application, provides the information about the acceptable and unacceptable areas of the screen to the presenting application. The presenting application updates the UI layout to avoid presenting content or UI elements in the unacceptable areas of the screen now and in the future, and resends the updated UI layout to the embodiment.

Such manners of modifying and updating the UI layout are particularly useful when the presenting application resides on the same data processing system, such as a mobile device, where the embodiment is executing. In such cases, the presenting application is generally presenting the UI layout to a single screen—the screen of the mobile device, and the UI layout can be modified or updated for a particular issue with the sensitivity of a particular screen at a particular client.

An embodiment performs the sensitivity measurements from time to time or upon certain events. When the sensitivity information changes, causing a change in the acceptable and unacceptable areas of the screen, the UI layout can be modified, updated, or both, in response to such changes in the sensitivity information. When an embodiment communicates the sensitivity information to a presenting application, the embodiment can also send updated sensitivity information to the presenting application so that the presenting application may update the UI layout accordingly.

One embodiment also collects screen usage data. Screen usage data includes data about the UI elements that occupy a grid cell, and their frequency of occupying the grid cell. The embodiment stores this screen usage data in a repository, which can be shared by one or more users of one or more screens. Over time, an analysis of the screen usage data can indicate whether certain UI elements, such as application launch icons to launch certain applications, are so heavily used or touched that the grid cell where they reside experiences screen rot as a result.

A method of an embodiment described herein, when implemented to execute on a device or data processing system, comprises substantial advancement of the functionality of that device or data processing system in using interface devices with diminished touch sensitivity. For example, prior-art continues to present content and UI elements in areas of a screen that have unacceptable sensitivity measurements. An embodiment monitors the changing sensitivity information of the various portions of a screen. An embodiment adapts a UI layout or causes the UI layout to be adapted, to avoid presenting content to UI elements in those parts of a screen that have unacceptable sensitivity. Such manner of dynamically adapting a UI layout for avoiding portions of a screen with unacceptable sensitivity without requiring touch interaction in those portions and still continuing to use the remaining portions of the screen is unavailable in presently available devices or data processing systems. Thus, a substantial advancement of such devices or data processing systems by executing a method of an embodiment is achieved by allowing continued use of a screen with screen rot through UI layout modification.

The illustrative embodiments are described with respect to certain UI layouts, UI elements, screens, interface devices, grid, cells, sensitivity levels, screen rot levels, presenting applications, modifications, feedback instructions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
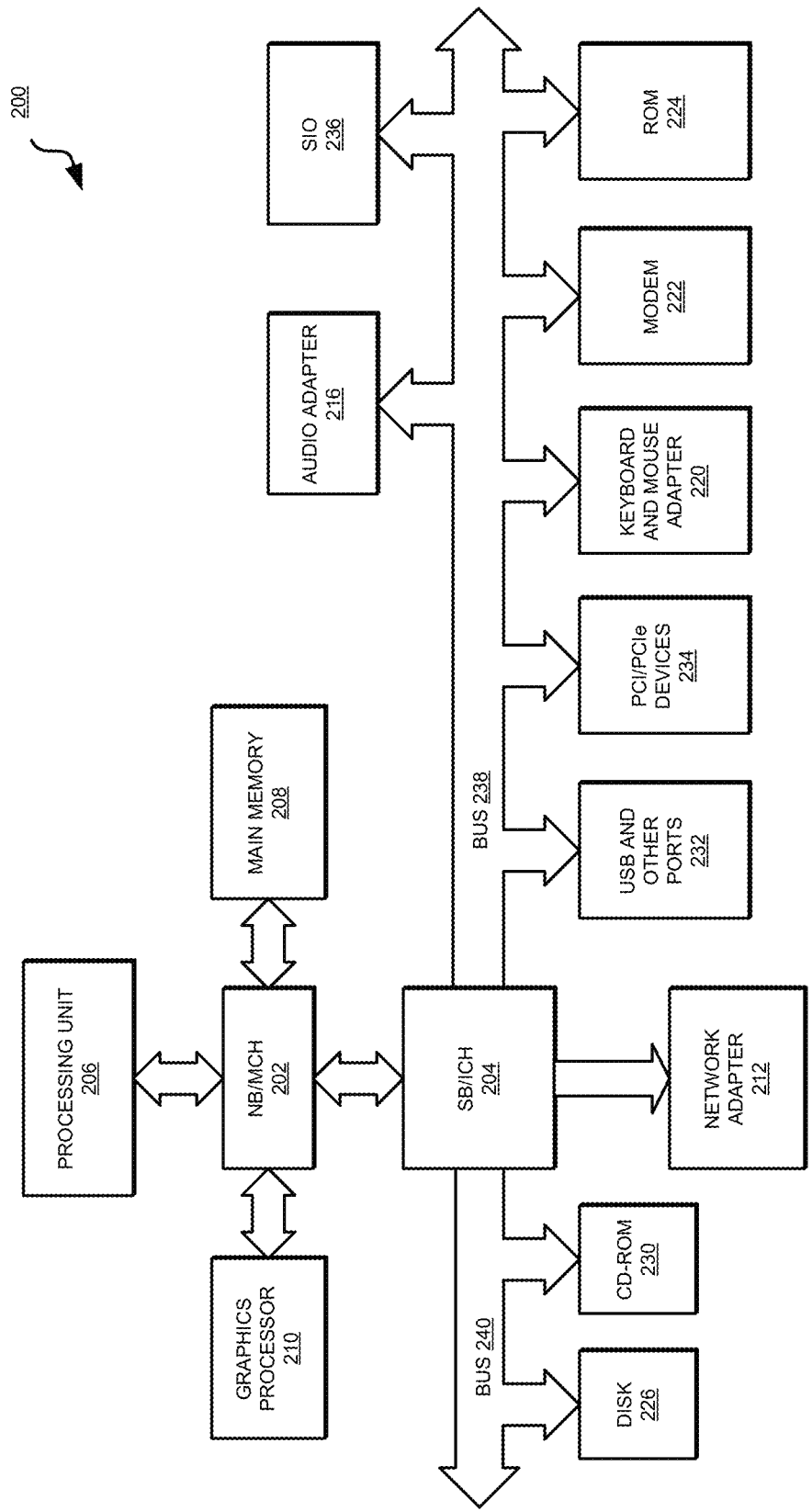
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Screen 133 in device 132 is an example of an interface device contemplated herein, such as a touchscreen. Application 134 implements an embodiment described herein. Presenting application 136 executes in device 132 and provides a UI layout for rendering on screen 133. Application 134 modifies such UI layout, or causes presenting application 136 to update the UI layout in a manner described herein. Presenting application 105 provides a UI layout over network 102 for rendering on screen 133. Application 134 modifies such UI layout, or causes presenting application 105 to update the UI layout in a manner described herein. Application 134 stores screen usage data 109 in repository 108.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

With reference to FIG. 3, this figure depicts a block diagram of an example configuration for measuring and presenting screen sensitivity in accordance with an illustrative embodiment. Device 302 is an example of device 132 in FIG. 1. Screen 304 is an example of screen 133 in FIG. 1.

Grid lines form grid 306 as shown. Grid 306 may be invisible or virtual in one embodiment and visible in another embodiment. Cells 308, 310, 312, 314, 316, and 318 are example cells selected from grid 306 to describe the operations of an embodiment.

The embodiment measures the sensitivity in some or all of the cells in grid 306. Only as an example, suppose that according to the sensitivity measurements in the various grid cells, the sensitivity in cell 308 is poor, the sensitivity in cell 310 is average, the sensitivity in cell 312 is normal, and the sensitivity in cell 314 is excellent. Similarly, the sensitivity in cell 316 is normal, and the sensitivity in cell 318 is poor. Legend 320 describes the example sensitivities depicted in FIG. 3.

An embodiment perceptibly represents the measured sensitivities on screen 304 to a user. For example, according to such an embodiment, grid 306 is visible on screen 304, and cells 308, 310, 312, 314, 316, and 318 are shaded or colored as shown. Legend 320 may be shown on screen 304 depending on the implementation.

When presented with such a perceptible representation of the sensitivities of the various regions of the screen, the user becomes informed about the diminishing capabilities of the screen, which the user might not otherwise comprehend. Furthermore, if the user has a choice and an ability to rearrange the UI elements on the screen, such a perceptible representation allows the user to rearrange the UI elements with the knowledge of acceptable and unacceptable screen rot regions.

Note that the drawings of this disclosure are limited to black and white drawings only to meet the drawings requirements of the United States Patent and trademark Office and not to imply any limitation thereto. When implemented in a color supporting device and screen, the depicted shading can be replaced with different colors, as described in this disclosure. Similarly, the shading or the colors can be replaced or augmented with animations, sounds, and other features as also described herein, within the scope of the illustrative embodiments.

Figure 4:
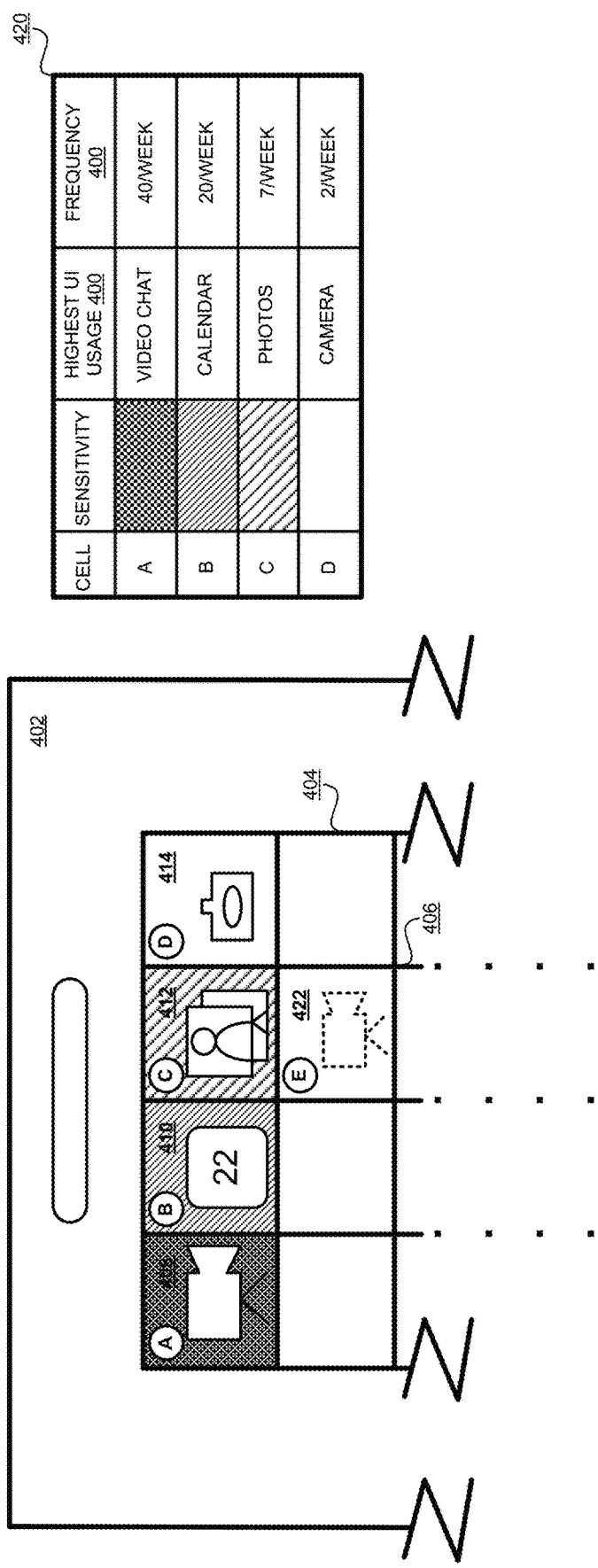
FIG. 4 depicts a block diagram of a configuration for representing screen usage data in accordance with an illustrative embodiment.

With reference to FIG. 4, this figure depicts a block diagram of a configuration for representing screen usage data in accordance with an illustrative embodiment. Device 402 is an example of device 302 in FIG. 3. Screen 404 is an example of screen 304 in FIG. 3. Cells 408 (labeled cell "A"), 410 (labeled cell "B"), 412 (labeled cell "C"), and 414 (labeled cell "D") correspond to cells 308, 310, 312, and 314, respectively, in FIG. 3.

As described with respect to FIG. 3, the measured sensitivities of cells 408, 410, 412, and 414 are represented using shading of corresponding weights. In this figure, an embodiment is shown to present to the user statistical information about the usage of the various cells. Legend 420 and grid 406 are perceptibly presented on screen 404 to the user.

For example, legend 420 shows that cell A has poor sensitivity, and that area of the screen is most frequently occupied by an UI element to launch a video chat application approximately 40 times per week. Similarly, legend 420 shows that cell B has average sensitivity, and that area of the screen is most frequently occupied by an UI element to launch a calendar application approximately 20 times per week. Likewise, legend 420 shows that cell C has normal sensitivity, and that area of the screen is most frequently occupied by an UI element to launch a photo album application approximately 7 times per week. Legend 420 shows that cell D has excellent sensitivity, and that area of the screen is most frequently occupied by an UI element to launch a camera application approximately 2 times per week.

When presented with this information, the user is enabled to reposition the video chat launching UI element from cell A to another cell with better sensitivity. For example, the user can move the video chat application launching UI element from cell A to cell 422 (labeled "E"), which has excellent sensitivity according to the weight of the shading (or absence thereof) in cell E.

An embodiment modifies a UI layout in a similar manner. Of example, suppose that a presenting application were presenting the UI layout with the video chat application launch UI element in cell A. An embodiment analyzes the UI layout, determines that cell A has unacceptable sensitivity, determines that the UI element in cell A elicits or requires a touch interaction from the user, and repositions the video chat application launch UI element to cell E.

Figure 5:
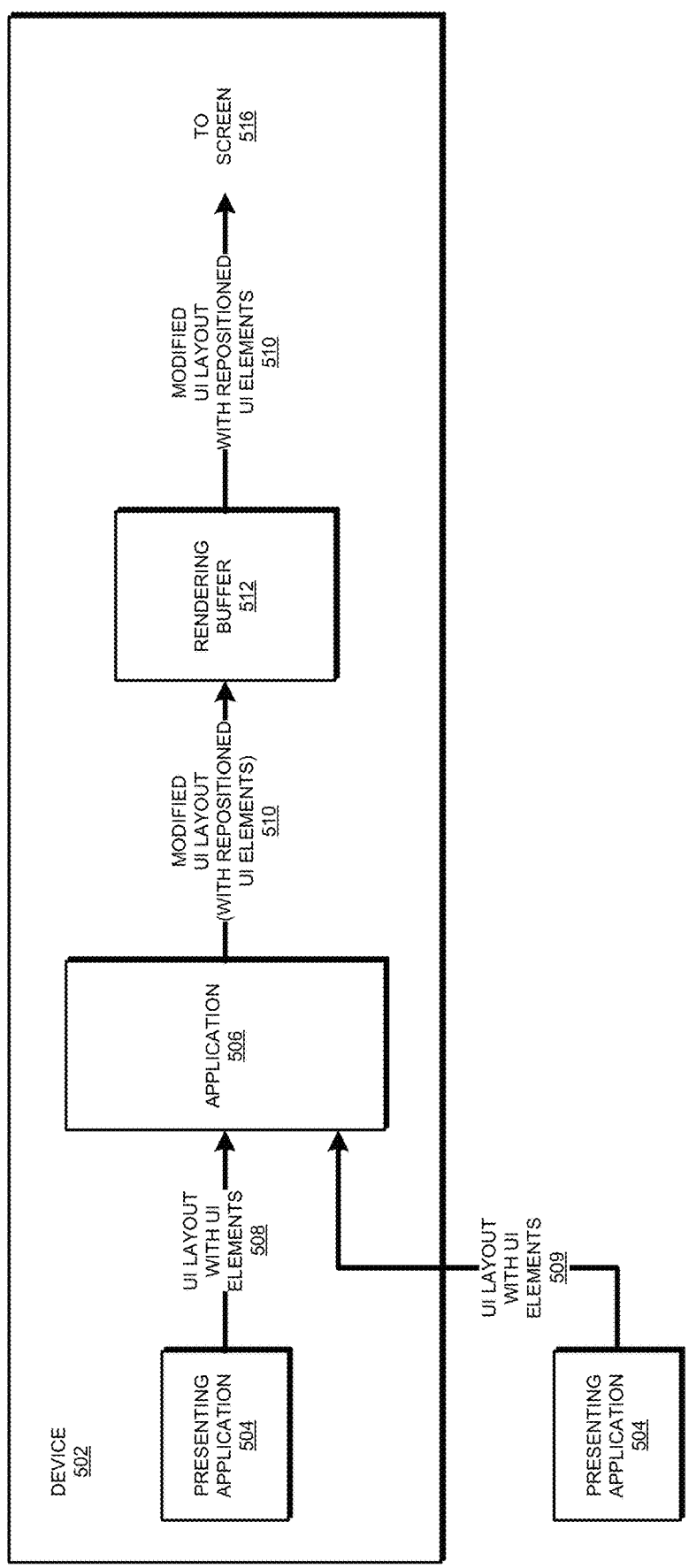
FIG. 5 depicts a block diagram of an example configuration for reconfiguring a user interface according to a deterioration of an interface device in accordance with an illustrative embodiment.

With reference to FIG. 5, this figure depicts a block diagram of an example configuration for reconfiguring a user interface according to a deterioration of an interface device in accordance with an illustrative embodiment. Device 502 is an example of device 302 or 402 in FIG. 3 or 4, respectively. Presenting application 504 is an example of presenting application 136 in FIG. 1. Presenting application 505 is an example of presenting application 105 in FIG. 1. Application 506 is an example of application 134 in FIG. 1.

Presenting application 504 sends UI layout 508 to application 506. UI layout 508 includes a set of UI elements. Alternatively, presenting application 505 sends UI layout 509 to application 506. UI layout 509 includes a set of UI elements. In some cases, presenting application 504 and presenting application 505 may both send parts of a complete UI layout in this manner.

Application 506 modifies the UI layout received from presenting application 504, presenting application 505, or both. Application 506 creates and outputs modified UI layout 510 to rendering buffer 512 in a manner described herein. Modified layout 510 includes one or more repositioned UI elements as described elsewhere in this disclosure.

Modified UI layout with repositioned UI elements 510 is loaded in rendering buffer 512. In case of a touchscreen type interface device, rendering buffer 512 is a memory that drives the display of content on touchscreen 516. When other types of interface devices are used in place of screen 516, a structure corresponding to rendering buffer 512 that is suitable for that type of interface device can be used in a similar manner within the scope of the illustrative embodiments.

Figure 6:
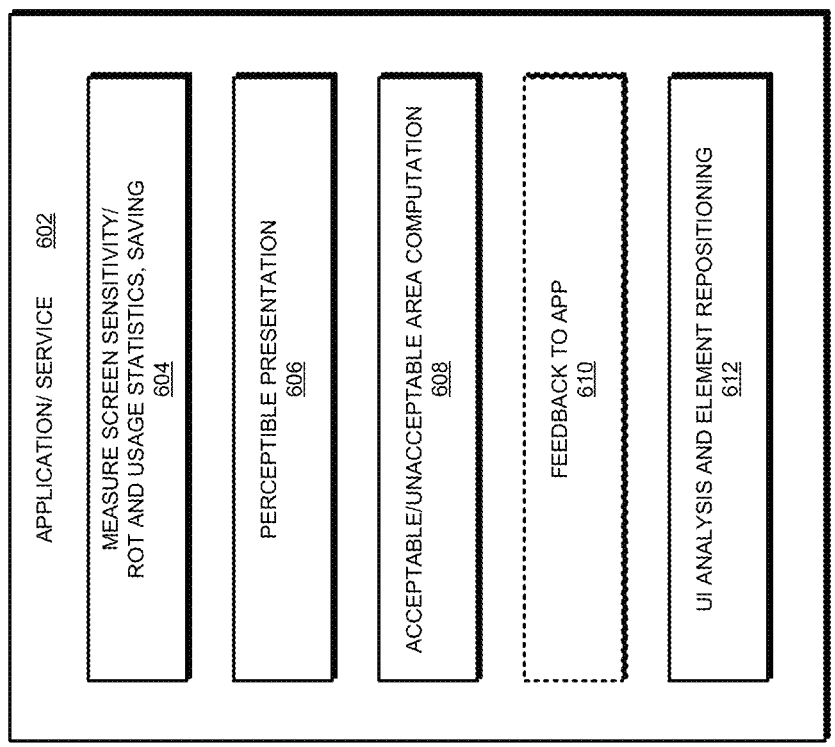
FIG. 6 depicts a block diagram of an example application for reconfiguring a user interface according to a deterioration of an interface device in accordance with an illustrative embodiment.

With reference to FIG. 6, this figure depicts a block diagram of an example application for reconfiguring a user interface according to a deterioration of an interface device in accordance with an illustrative embodiment. Application 602 is an example of application 506 in FIG. 5.

Component 604 measures the sensitivity or screen rot in various portions of a given screen, such as described with respect to FIG. 3 and elsewhere in this disclosure. Component 604 also measures the screen usage, such as described with respect to FIG. 4 and elsewhere in this disclosure. Component 604 also saves the screen usage data into a repository as described earlier.

Component 606 generates the presentations of the sensitivities and screen usage, such as the depictions in FIGS. 3 and 4. The presentations are perceptible to a user, such as visible on a touchscreen or tactically perceptible on a Braille board.

Component 608 computes or determines the acceptable and unacceptable areas on the screen using the sensitivity measurements from component 604. Component 610 optionally provides feedback instructions to a presenting application based on the determinations of component 608.

Component 612 analyzes a UI layout sent from a presenting application. Component 612 repositions a UI element from an unacceptable region of the screen to an acceptable region of the screen.

Component 612 produces a modified UI layout with the repositioned UI elements. In one embodiment, application 602 outputs the modified UI layout to a rendering buffer or a graphics driver. Optionally, component 610 also provides the modified UI layout to a presenting application.

Figure 7:
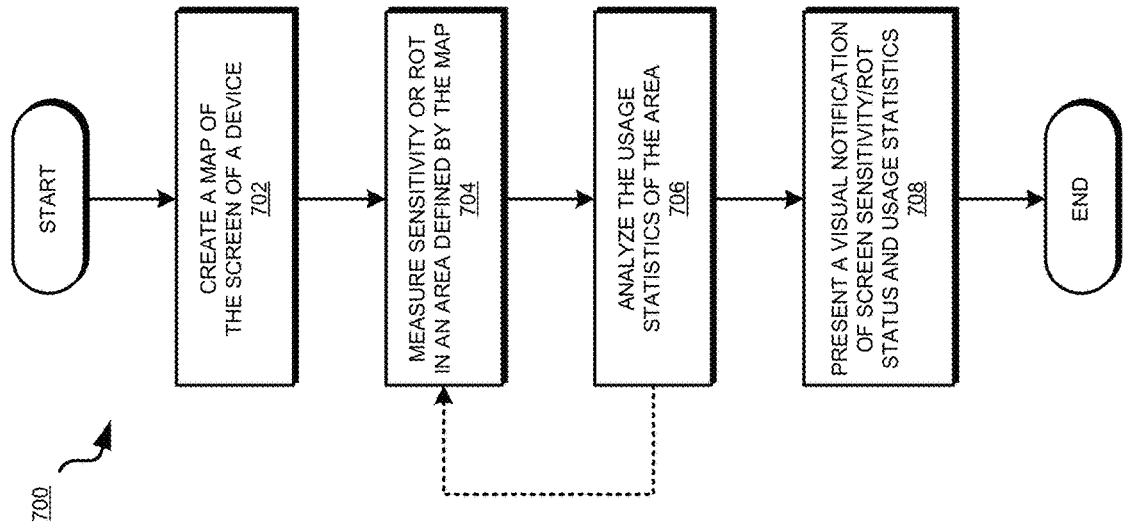
FIG. 7 depicts a flowchart of an example process for reconfiguring a user interface according to a deterioration of an interface device in accordance with an illustrative embodiment.

With reference to FIG. 7, this figure depicts a flowchart of an example process for reconfiguring a user interface according to a deterioration of an interface device in accordance with an illustrative embodiment. Process 700 can be implemented in application 602 in FIG. 6.

The application creates a map of the screen of a device (block 702). The application measures the sensitivity or screen rot in an area defined by the map (block 704). The application analyzes the usage statics, to wit, screen usage, of the area (block 706). The application repeats blocks 704 and 706 for as many areas of the screen that may have to be analyzed in this manner.

The application presents a visual notification, to wit, perceptible presentation, of the screen sensitivities or screen rot, the screen usage data, or both, on the screen (block 708). The application ends process 700 thereafter.

Figure 8:
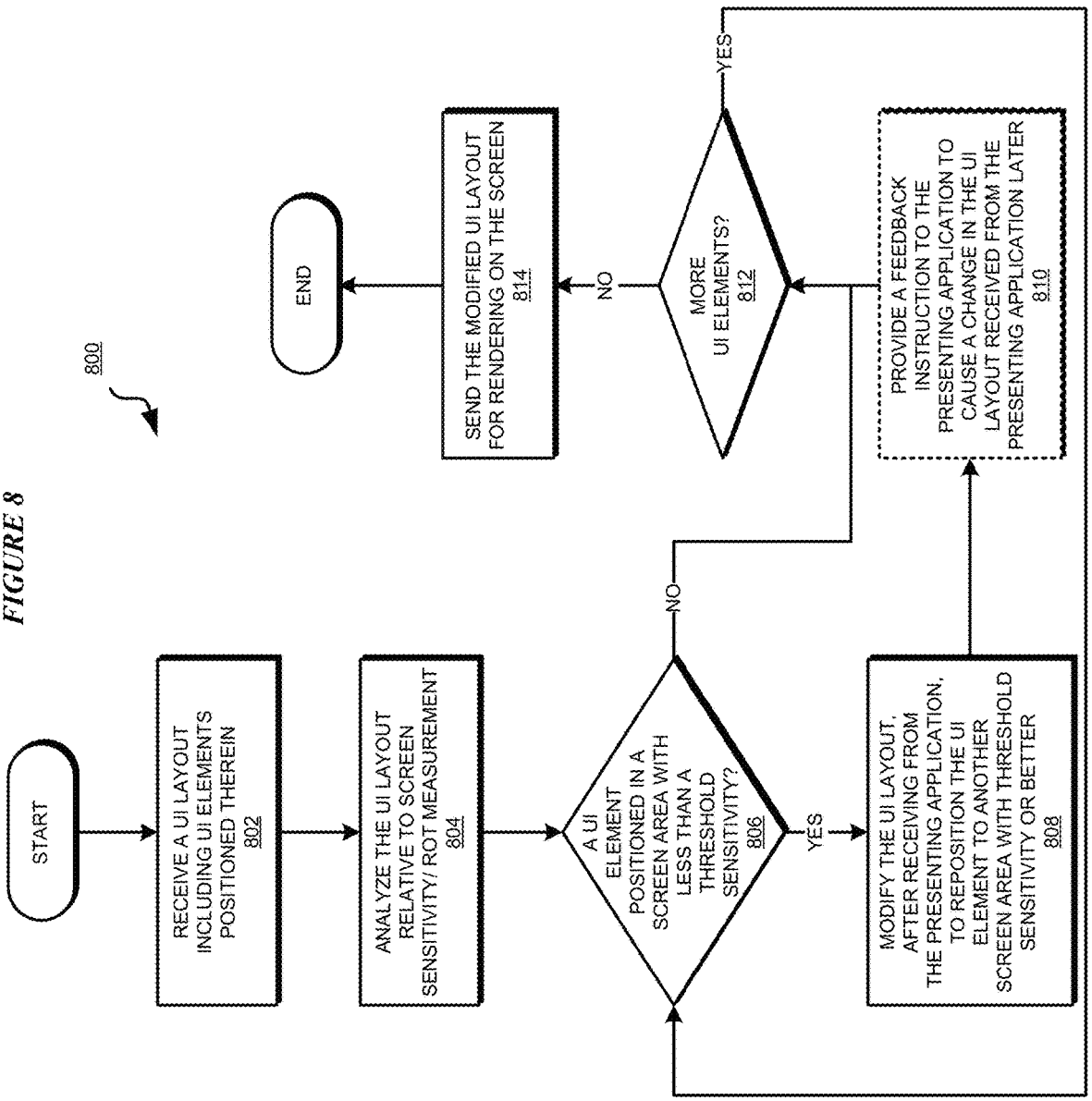
FIG. 8 depicts a flowchart of another example process for reconfiguring a user interface according to a deterioration of an interface device in accordance with an illustrative embodiment.

With reference to FIG. 8, this figure depicts a flowchart of another example process for reconfiguring a user interface according to a deterioration of an interface device in accordance with an illustrative embodiment. Process 800 can be implemented in application 602 in FIG. 6.

The application receives a UI layout with a set of one or more UI elements positioned therein from a presenting application (block 802). The application analyzes the UI layout relative to screen sensitivity measurement data collected previously, such as by executing process 700 of FIG. 7 (block 804).

For a UI element, the application determines whether the UI element is positioned in a screen area of unacceptable sensitivity, to wit, less than a pre-determined threshold of sensitivity (block 806). If the UI element is not positioned in a screen area of unacceptable sensitivity ("No" path of block 806), the application proceeds to block 812. If the UI element is positioned in a screen area of unacceptable sensitivity ("Yes" path of block 806), the application modifies the UI layout received from the presenting application, to reposition the UI element from the area of unacceptable sensitivity to another area on the screen that has acceptable sensitivity and screen space to accommodate the UI element (block 808).

The application optionally provides a feedback instruction to the presenting application, to cause a change in a UI layout that will be received from the presenting application later (block 810). The feedback instruction can include the sensitivity measurements of various areas of the screen, a repositioned placement of the UI element on the modified UI layout, or both.

The application determines if more UI elements in the received UI layout are to be analyzed and/or manipulated in a similar manner (block 812). If more UI elements are to be analyzed and/or manipulated ("Yes" path of block 812), the application returns process 800 to block 806. If no more UI elements are to be analyzed and/or manipulated ("No" path of block 812), the application sends the modified UI layout for rendering on the screen (block 814). The application ends process 800 thereafter.

Thus, a computer implemented method, system or apparatus, and computer program product are provided in the illustrative embodiments for reconfiguring a user interface according to a deterioration of an interface device. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising a computer readable storage device including computer usable code for reconfiguring a user interface (UI) layout according to a deterioration of an interface device, the computer usable code comprising:

computer usable code for analyzing, using a processor and a memory of a data processing system, a UI layout to determine a position of a UI element on the interface device according to the UI layout;

computer usable code for determining that the UI element is positioned in a first area of the interface device, the first area having a first sensitivity to touch, wherein the first sensitivity is below a level of sensitivity;

computer usable code for identifying a second area of the interface device, the second area having a second sensitivity to touch, wherein the second sensitivity is at least equal to the level of sensitivity, the interface device being mapped into at least the first area and the second area;

computer usable code for categorizing, using a set of sensitivity thresholds, the first area into a first category of sensitivity levels from a set of categories of sensitivity levels according to the first sensitivity, and categorizing the second area into a second category of sensitivity levels from a set of categories of sensitivity levels according to the second sensitivity;

computer usable code for relocating the UI element from the first area to the second area thereby forming a modified UI layout;

computer usable code for sending the modified UI layout for rendering on the interface device, wherein the rendering includes presenting the mapping;

computer usable code for mapping the interface device into a plurality of areas, the plurality of areas including the first area and the second area;

computer usable code for measuring a sensitivity corresponding to each area in the plurality of areas;

computer usable code for categorizing, using the set of sensitivity thresholds, each area in the plurality of areas according to a corresponding sensitivity of each area into a category from a set of categories;

computer usable code for assigning, from a set of indicators, a first indicator to the first category and a second indicator to the second category, wherein the first indicator and the second indicator are configured to be perceptible on the interface device to a user of the interface device; and computer usable code for perceptibly presenting the mapping using the interface device, wherein the first indicator is perceptibly associated with the first area, and the second indicator is perceptibly associated with the second area.

2. The computer usable program product of claim 1, wherein an indicator in the set of indicators is a color, and wherein the categories in the set of categories are color coded to different colors.

3. The computer usable program product of claim 1, wherein an indicator in the set of indicators is a shading, and wherein the categories in the set of categories are coded using shadings of different weights.

4. The computer usable program product of claim 1, wherein an indicator in the set of indicators is an animation, and wherein the categories in the set of categories are coded using animations of different speed.

5. The computer usable program product of claim 1, wherein an indicator in the set of indicators is a tactile output, and wherein the categories in the set of categories are coded using tactile outputs having different sensations.

6. The computer usable program product of claim 1, further comprising:

computer usable code for measuring a usage of the first area, wherein the usage of the first area comprises a number of times a particular UI element is positioned in the first area, wherein the particular UI element receives a touch-based input in the first area; and computer usable code for presenting data of the usage of the first area together with data of the first sensitivity and an identifier of the particular UI element using the interface device.

7. The computer usable program product of claim 1, further comprising:

computer usable code for sending, to a presenting application of the UI layout, measurements of the first sensitivity and the second sensitivity together with descriptions of the first area and the second area; and computer usable code for causing, as a result of sending the measurements and the descriptions, the presenting application of the UI layout to change the UI layout when the presenting application sends the UI layout at a later time.

8. The computer usable program product of claim 7, further comprising:

computer usable code for further sending the modified UI layout to the presenting application of the UI layout; and computer usable code for directing, as a result of sending the modified layout to the presenting application, a manner in which the presenting application changes the UI layout.

9. The computer usable program product of claim 1, further comprising:

computer usable code for determining, as a part of identifying the second area, that the second area has space to accommodate the UI element.

10. The computer usable program product of claim 1, wherein the interface device is a touch-sensitive screen of the data processing system.

11. The computer usable program product of claim 1, wherein the interface device is a tactile output device to present Braille content from the data processing system.

12. The computer usable program product of claim 1, further comprising:

computer usable code for receiving the UI layout from a presenting application, wherein forming the modified UI layout occurs without the presenting application knowing about the relocating.

13. The computer usable program product of claim 1, wherein the computer usable code is stored in a computer readable storage device in a data processing system, and wherein the computer usable code is transferred over a network from a remote data processing system.

14. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

15. A data processing system for reconfiguring a user interface (UI) layout according to a deterioration of an interface device, the data processing system comprising:

a storage device, wherein the storage device stores computer usable program code; and a processor, wherein the processor executes the computer usable program code, and wherein the computer usable program code comprises:

computer usable code for analyzing, using a processor and a memory of a data processing system, a UI layout to determine a position of a UI element on the interface device according to the UI layout;

computer usable code for determining that the UI element is positioned in a first area of the interface device, the first area having a first sensitivity to touch, wherein the first sensitivity is below a level of sensitivity;

computer usable code for identifying a second area of the interface device, the second area having a second sensitivity to touch, wherein the second sensitivity is at least equal to the level of sensitivity the interface device being mapped into at least the first area and the second area;

computer usable code for categorizing, using a set of sensitivity thresholds, the first area into a first category of sensitivity levels from a set of categories of sensitivity levels according to the first sensitivity, and categorizing the second area into a second category of sensitivity levels from a set of categories of sensitivity levels according to the second sensitivity;

computer usable code for relocating the UI element from the first area to the second area thereby forming a modified UI layout;

computer usable code for sending the modified UI layout for rendering on the interface device, wherein the rendering includes presenting the mapping;

computer usable code for mapping the interface device into a plurality of areas, the plurality of areas including the first area and the second area;

computer usable code for measuring a sensitivity corresponding to each area in the plurality of areas;

computer usable code for categorizing, using the set of sensitivity thresholds, each area in the plurality of areas according to a corresponding sensitivity of each area into a category from a set of categories;

computer usable code for assigning, from a set of indicators, a first indicator to the first category and a second indicator to the second category, wherein the first indicator and the second indicator are configured to be perceptible on the interface device to a user of the interface device; and computer usable code for perceptibly presenting the mapping using the interface device, wherein the first indicator is perceptibly associated with the first area, and the second indicator is perceptibly associated with the second area.

16. The data processing system of claim 15, wherein an indicator in the set of indicators is a color, and wherein the categories in the set of categories are color coded to different colors.

* * * * *